Nov. 21, 1950     C. BRUNO     2,531,251
ADJUSTABLE STILTS
Filed Dec. 12, 1946     5 Sheets-Sheet 3
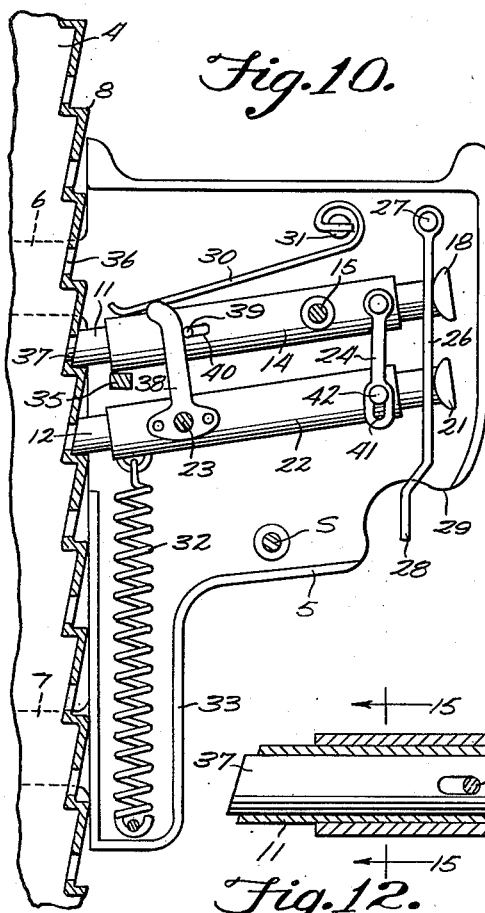
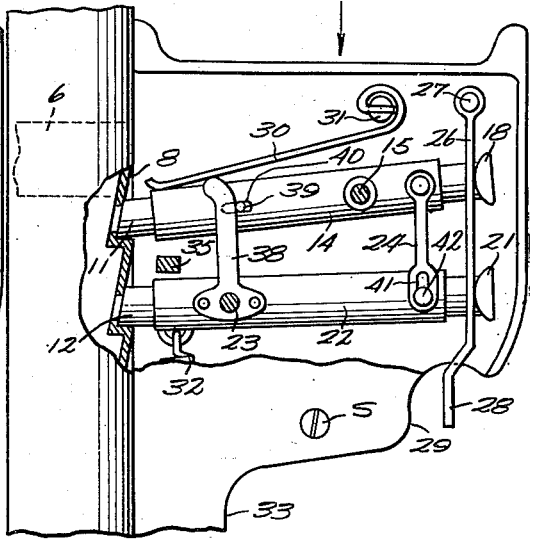
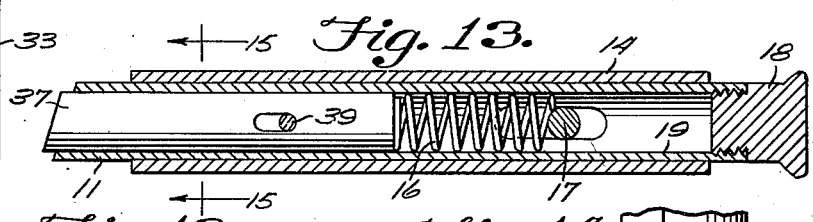
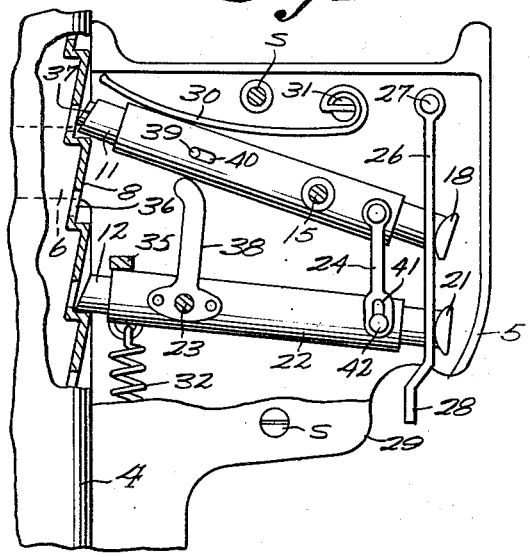
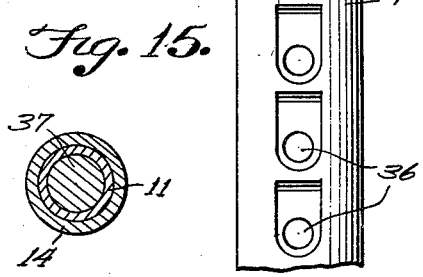
INVENTOR.
Carl Bruno,
BY Victor J. Evans & Co.
ATTORNEYS Nov. 21, 1950  
C. BRUNO  
2,531,251  
ADJUSTABLE STILTS  
Filed Dec. 12, 1946  
5 Sheets-Sheet 4
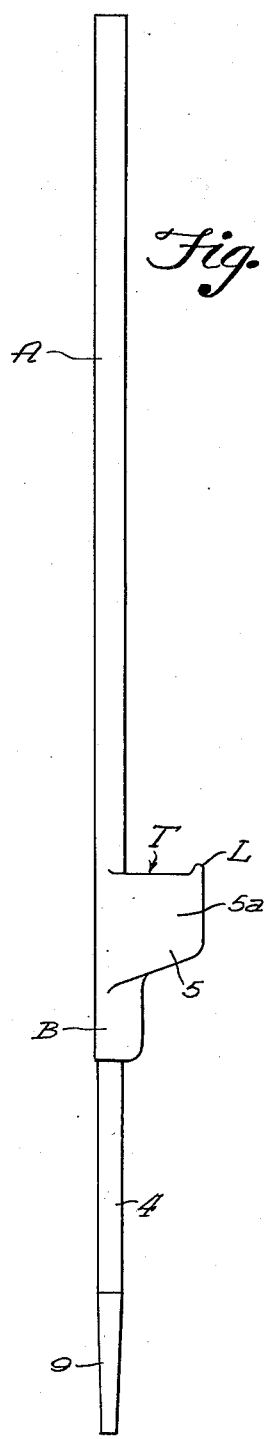
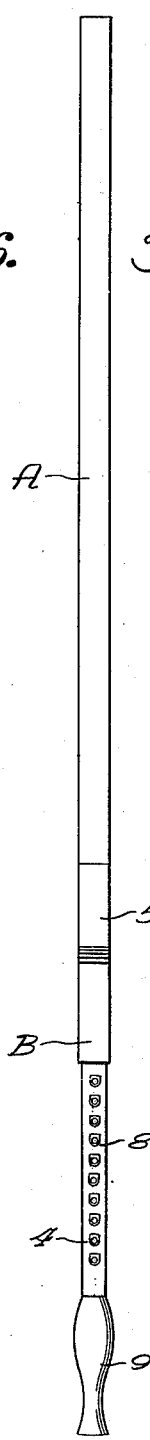
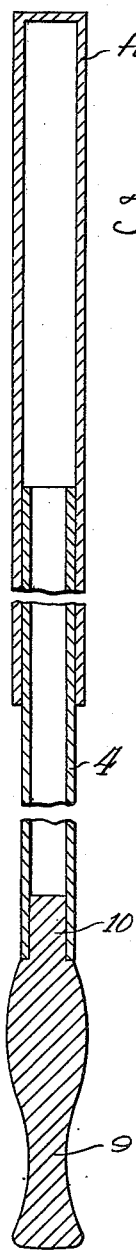
INVENTOR.  
Carl Bruno,  
BY Victor J. Evans & Co.  
ATTORNEYS Nov. 21, 1950 — C. BRUNO — 2,531,251
ADJUSTABLE STILTS
Filed Dec. 12, 1946 — 5 Sheets-Sheet 5
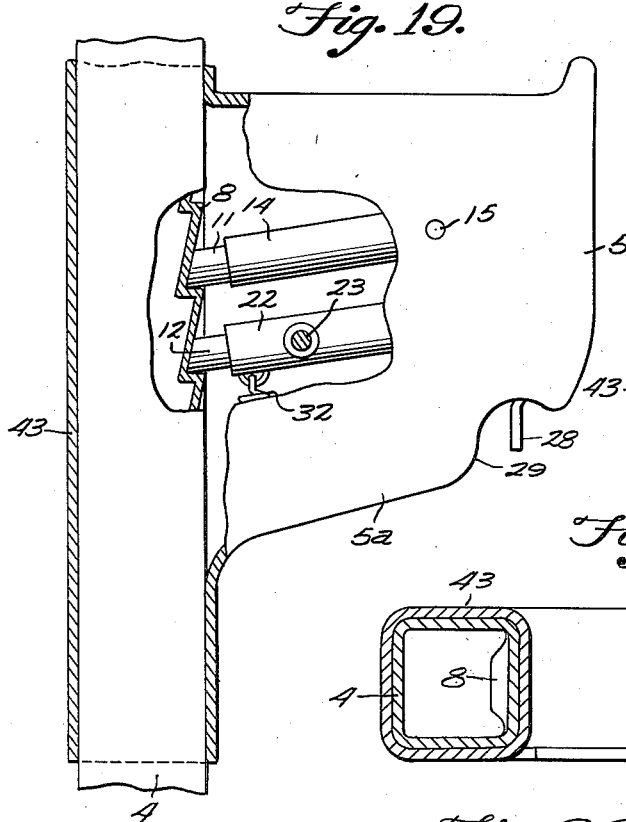
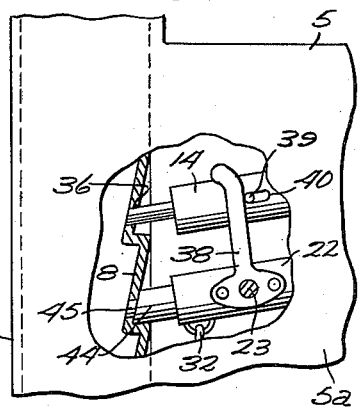
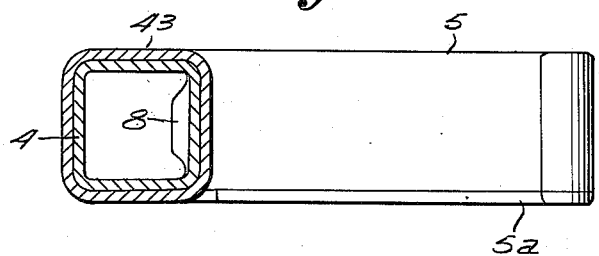
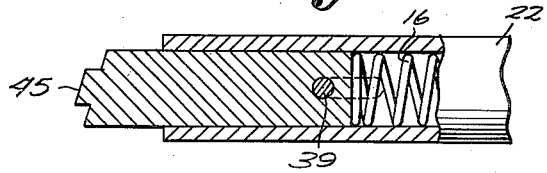
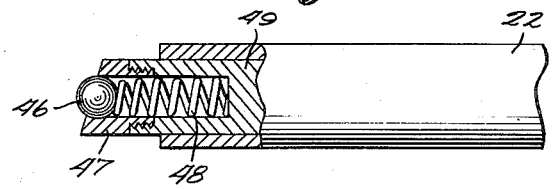
INVENTOR.
Carl Bruno,
BY Victor J. Evans & Co.
ATTORNEYS Patented Nov. 21, 1950

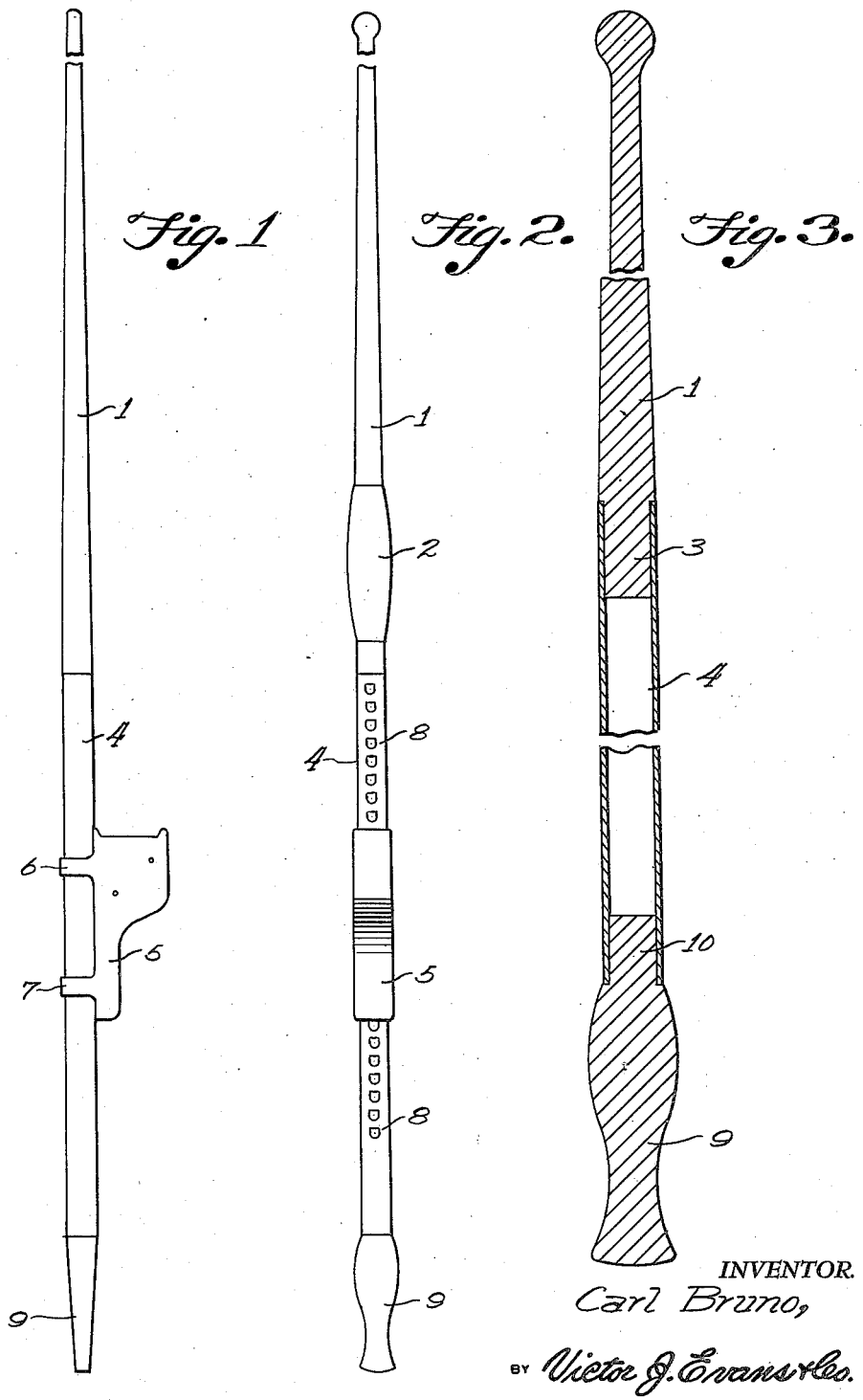

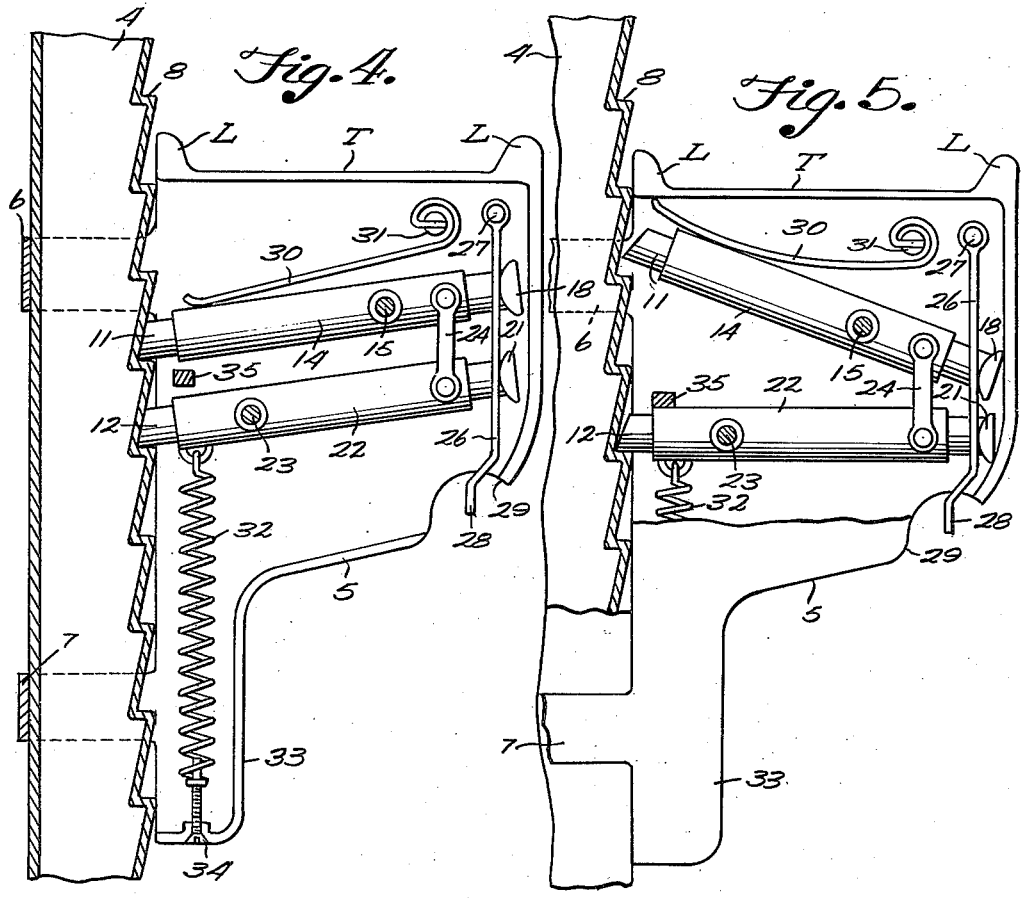
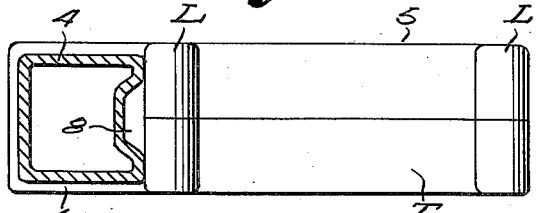
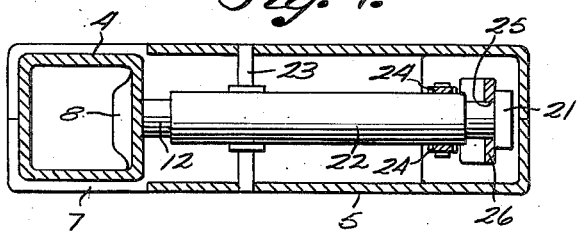
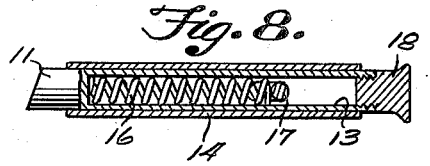

2,531,251

UNITED STATES PATENT OFFICE 2,531,251

ADJUSTABLE STILT

Carl Bruno, Encino, Calif.

Application December 12, 1946, Serial No. 715,712

5 Claims. (Cl. 272—70.1)

My present invention relates generally to improvements in amusement and exercising devices for outdoor sports, and more specifically to adjustable stilts of the type utilizing an adjustable foot-block or hollow step that encloses foot-pressure actuated means in coaction with a ratchet mechanism for adjusting the foot-blocks upon the stilts at desired heights, and by means of which the foot blocks may automatically be elevated step-by-step, from a minimum height to a maximum height upon the stilts.

The primary object of the invention is the provision in multiples of identical, complementary, and interchangeable stilts, for use in pairs, each of which consists of a minimum number of component parts that may with facility be manufactured at comparatively low cost of production and assembled with convenience, to provide a resiliently cushioned walking stilt that eliminates shocks and facilitates the walking movement of the operator, thereby rendering more comfortable and less tiring the exercise of this particular sport.

The invention consists in certain novel features of construction and combinations and arrangements of parts involving the combination with a stilt having a ratchet bar, a hollow vertically adjustable foot-block, and means within the block co-acting with the ratchet bar for elevating and supporting the block, together with foot-pressure operated means for operating the elevating means, and for cushioning the walking movements of the operator of the stilt as will hereinafter be described in detail, and specifically set forth in the appended claims.

In the accompanying drawings I have illustrated one complete example, and several modifications of parts, of a physical embodiment of my invention, in which the parts are combined and arranged in accord with modes I have devised for the practical application of the principles of my invention. It will, however, be understood that changes and alterations may be made and are contemplated in these exemplifying drawings and mechanical structures, within the scope of my claims, without departing from the principles of the invention.

Figure 1 is a view in side elevation of one of a pair of stilts in which my invention is embodied; and Figure 2 is an edge view of the left-leg stilt of Fig. 1.

Figure 3 is an enlarged detail vertical sectional view, broken away for convenience of illustrating the invention, showing the united sections of the stilt or standard.

Figure 4 is an enlarged, detail vertical sectional view of the ratchet portion of a stilt and the hollow-foot-block or step, together with the enclosed ratchet mechanism, in uplifted position; and Figure 5 is a similar view with the block depressed under foot-pressure and the ratchet mechanism in supporting position.

Figure 6 is a transverse sectional view through the rectangular tubular ratchet bar or section of the stilt showing the sectional hollow block with its top face or tread and side guide-lugs for the foot of the operator.

Figure 7 is a horizontal sectional view through the stilt and foot-block showing the supporting detent in coaction with the rack of the stilt.

Figure 8 is a longitudinal detail sectional view through the lever-housing of the lifting pawl of the ratchet mechanism.

Figure 9 is a view similar to Fig. 8 of the holding or supporting detent of the ratchet mechanism.

Figures 10, 11, and 12 illustrate three positions of the ratchet mechanism of a slightly modified assembly or parts.

Figure 13 is an enlarged longitudinal sectional view of a modified form of the lifting pawl with its lever-housing.

Figure 14 is a face view of a portion of the rectangular tubular rack bar in Figs. 10, 11, and 12; and Figure 15 is a transverse sectional view at line 15—15 of Fig. 13.

Figures 16 and 17 are respectively a side view and an inner edge view of a modified arrangement of the invention including a sectional stilt having the foot-block integral with one of the stilt sections; and Figure 18 is an enlarged vertical sectional view partly broken away for convenience of illustration of the stilt in Figs. 16 and 17.

Figures 19 and 20 show respectively modified arrangements or positions of the ratchet mechanism of the stilt wherein the handle section and the foot-block are integral.

Figure 21 is a horizontal sectional view through the rack bar, and the relatively movable handle section of the stilt, showing the top face or tread of the integral foot-block.

Figure 22 shows a detail sectional view of a modified form of holding and locking detent; and Figure 23 is a similar view showing a further modified form of the locking and supporting detent.

In Figs. 1, 2, 3, the stilt, standard, or leg, which is shown as fully extended, is made up of sections that may be separated and compactly arranged for shipping and storing, and to this end the upper section or handle portion 1 is preferably fashioned of light but strong wood and equipped with a hand-grasp 2. The reduced end 3 of the handle section is formed as a joint pin that is tightly fitted in the upper or socket end of a tubular metallic rack-section 4 of the stilt.

The rack-section or tubular rack bar 4 which is provided with ratchet teeth is angular, rectangular, or square in cross section and fashioned of aluminum or other light and strong metal, and it acts as a guide for the vertically adjustable, hollow, foot-block 5, or step, which may be fashioned of magnesium or other suitable metal. The hollow foot block is preferably made up of two complementary sections that are rigidly united by screws S which tie the parts together, and the block is provided with angular, spaced guide loops or bands 6 and 7 that enclose the angular rack bar with a sliding fit for guiding the vertical movements of the depressible and cushioned foot-block.

As indicated in Fig. 2 and other figures the rack bar is fashioned with a series of vertically spaced rack or ratchet notches 8, extending the full length of the upright tube, and the notches are preferably stamped or pressed in the metal of the tube by a suitable machine tool.

At the lower end of the tubular rack bar, a shank or foot section 9 of the stilt is affixed by means of a reduced head 10 fitted tightly in the tube 4; and the sections of the stilt are thus rigidly united to provide a stable and substantial standard or stilt for the operator.

In Figs. 4 through 9 the hollow foot block is shown as having an upper tread face T upon which the foot of the operator rests, and spaced guide lugs L to prevent displacement of the foot, and the cushioned or resiliently supported and depressible foot-block is combined with the tubular rack bar through ratchet connections including a spring depressed lifting pawl 11, and a spring held holding detent or pawl 12, which are vertically spaced and pivotally mounted within the hollow foot-block.

In Fig. 8, it will be seen that the lifting pawl 11 is fashioned with a tubular shank 13 having a slidable fit in a cylindrical housing or sleeve providing a lever 14 that is pivoted at 15 transversely of the block or step 5, and a coiled spring 16 is interposed between the pawl and a pin 17 of the lever-housing tending to project the pawl into co-action with a notch 8 of the ratchet. The outer end of the tubular shank is closed by a head 18 that is threaded into the complementary end of the shank.

The holding or supporting detent or pawl 12 is also provided with a tubular shank or spring casing or sleeve 19 in which a spring 20 is enclosed, and the spring is interposed between the detent head and a headed-pin 21 which is threaded in the open end of the shank. The spring pressed detent is slidably fitted in an enclosing lever-housing 22 which is pivotally mounted at 23 transversely of and within the hollow foot-block or step of the stilt.

In Figs. 4 and 5 it will be noted that the two pivots 15 and 23 are spaced apart and located near the opposite ends of the respective lever-housings or carriers 14 and 22, and the outer ends of these two pivoted holders are pivotally connected by a pair of links 24, while the adjoining heads 18 and 21 of the lifting pawl and supporting detent respectively are guided for vertical movement in a slot 25 of a latch-lever 26. This lever 26 is vertically suspended from a pivot pin 27 mounted transversely in the foot block above the ratchet mechanism, and the lower end 28 of this lever projects through an opening or slot 29 in the lower portion of the foot-block. The lower end or handle 28 of the lever is readily accessible for a thumb or finger in pulling or retracting the pawl and the detent into their lever-housings, thus withdrawing them from engagement with the rack. By manipulation of this release lever 26 the foot-block may be manually operated or manipulated for applying the block to the stilt, for withdrawing the block from the stilt, and for vertically adjusting the block on the rack bar at desired height.

The pawl 11 when in operative position is resiliently pressed down into one of the ratchet notches or teeth by means of a spring blade 30 having one end anchored at 31 just below the tread of the hollow foot block, and when the operator places his foot and weight upon the tread T the block is slightly depressed from position of Fig. 4 to position in Fig. 5.

A helical spring 32, which is located in a hollow leg or extension 33 of the lower portion of the foot block is connected to the pivoted holder, carrier, or housing 22 of the detent for holding down the detent in operative position and co-action with the rack bar. The tension of the spring 32 may be adjusted by turning an anchoring screw 34 mounted in the lower end of the leg 33 where it is readily accessible from the exterior to vary the pressure of the detent on the wall of a notch 8 of the rack.

A cross bar or transversely arranged stop pin 35 is mounted within the hollow block between the working ends of the pawl and detent to limit upward swing of the detent 12 and also to limit the downward swing of the pawl 11.

When the operator places his foot and weight upon the hollow block the latter is depressed slightly causing the lever-holder 14 to swing the pawl upwardly against tension of spring blade 30 thereby elevating the pawl the space of one notch in the rack and also lifting the spring 30 into contact with the upper end of the block. The short arm of lever 14, through the links 24, depresses the long arm of the lever-holder 22 thereby lifting detent holder 22 against stop 35, thus locking the detent in supporting position on notch 8 of the rack; then when the operator takes a step and removes the load of his weight from the tread, spring 30 elevates the block, and this action is repeated as the operator walks on the stilts.

As before stated, various changes and alterations may be made in component parts and combinations of parts of the above described arrangement. For instance, in the slightly modified form of the invention shown in Figs. 10 to 15 and 20, notches 8 of the tubular rack are provided with locking holes or sockets 36, and the tubular pawl 11 integral with the sleeve 19 of the lever-holder 14 is equipped with a retractible pin 37 which is adapted to seat in a socket 36 and is pressed therein by a spring as 16. The pin is retracted against tension of the spring by means of a cam-arm 38 having its lower end rigidly mounted on the lever-housing or holder 22, and the upper free end of the cam arm co-acts with a transversely arranged guide pin 39 rigid with the pawl-pin 37.

The guide pin projects through slots 40 of the lever-holder 14, and as the detent lever-holder 22 swings to horizontal locking position of Fig. 11 pawl-pin 37 is retracted by the cam-arm in co-action with the guide pin 39.

In Figs. 10, 11, and 12, the pivot link 24 is provided with a slot 41 and pivot-pin 42 forms a connection that facilitates relative movement of the pawl and detent devices.

In the modified form of the stilt structure of Figs. 19, 20, and 21, the hollow foot-block 5 is provided with a cover plate 5a that is fastened in place as by screws S and the block is fashioned with an offset, integral slidable upright tubular extension or housing 43, rectangular in cross section, and having a sliding fit on the tubular rack bar 4.

In Figs. 20 and 22 a different arrangement of the holding detent is illustrated, wherein the retractible detent-pin 44, which co-acts with the notch 8, is provided with an integral head 45 that seats in a socket 36 of the tubular rack bar 4.

The detent-ball 46 for co-action with the socket 36 of the notch 8 in Fig. 23, is retained in a tubular screw plug 47 which forms the detent for holding action with the notch 8, and the ball is projected by a spring 48 mounted in sleeve 49 that is slidable in the lever-holder or housing 22.

In Figs. 16, 17, and 18 a modified form of the standard or leg of the stilt is disclosed, wherein the hollow foot block 5 is shown integral with a metallic tubular handle piece or section A of the stilt, and the lower end B of the section A slidably fits over the upper end of the rack bar 4; the block being provided with a removable cover plate 5a that is secured by screws, and may be removed to gain access to the interior of the block for assembly and adjustment of the interior working parts.

Having thus fully described my invention, what I claim as new and desire to secure by Letters Patent is:

1. An automatically adjustable stilt comprising a standard having ratchet teeth in one edge thereof, a foot block slidably mounted on said standard, horizontally disposed upper and lower pawls positioned in the said foot block, means pivotally mounting the said pawls in the foot block with the upper pawl fulcrumed at a point spaced from the outer end thereof and the lower pawl fulcrumed at a point spaced from the inner end, a link connecting the outer ends of the pawls with the link pivotally connected to the upper pawl close to the fulcrum and to the lower pawl at a point a considerable distance from the fulcrum whereby the downward pressure on the foot block actuates the upper pawl in the block to elevate its position therein, and resilient means in the foot block for elevating the block on the standard as the said downward pressure is released.

2. An automatically adjustable stilt comprising a standard having ratchet teeth in one edge thereof, a foot block slidably mounted on said standard, horizontally disposed upper and lower pawls positioned in the said foot block, means pivotally mounting the said pawls in the foot block with the upper pawl fulcrumed at a point spaced from the outer end thereof and the lower pawl fulcrumed at a point spaced from the inner end, a link connecting the outer ends of the pawls with the link pivotally connected to the upper pawl close to the fulcrum and to the lower pawl at a point a considerable distance from the fulcrum whereby the downward pressure on the foot block actuates the pawl in the block to elevate its position therein, resilient means in the foot block for elevating the block on the standard as the said downward pressure is released, and a latch lever for withdrawing the pawls from engagement with the ratchet teeth of the standard to manually release the said foot block.

3. In a stilt, the combination which comprises a standard having ratchet teeth in one side, a foot block slidably mounted on the stilt, a lifting pawl carrying sleeve positioned in the upper part of the foot block, means pivotally mounting the said lifting pawl carrying sleeve in the block at a point spaced from the outer end of the sleeve, a lifting pawl carried by the sleeve and positioned to engage the ratchet teeth of the standard, said lifting pawl having a head extending beyond the opposite end of the sleeve, resilient means in the sleeve urging the pawl toward the standard, a holding pawl carried in a sleeve positioned in the lower part of the foot block, means pivotally mounting the holding pawl carrying sleeve in the foot block at a point spaced from the inner end of the sleeve, a holding pawl carried by the said holding pawl carrying sleeve, said pawl having a head extending from the opposite end of the sleeve, resilient means in the holding pawl carrying sleeve for urging the pawl into engagement with the ratchet teeth of the standard, a release lever pivotally mounted in the foot block and positioned for engagement with the heads of the pawls for manually releasing the said pawls from engagement with the ratchet teeth of the standard, a spring in the foot block for urging the inner end of the lifting pawl carrying sleeve downwardly, a spring in the foot block for urging the inner end of the holding pawl carrying sleeve downwardly, and a link pivotally connecting the outer ends of the said pawl carrying sleeves the point at which the said link is connected to the sleeve of the lifting pawl being relatively close to the pivot point of the sleeve and the point at which the link is connected to the holding pawl being a considerable distance from the pivot thereof whereby a slight movement of the outer end of the holding pawl provides a longer movement of the inner end of the lifting pawl so that the said lifting pawl moves upwardly to the next ratchet tooth of the standard.

4. A stilt as described in claim 1, wherein the standards are formed with telescoping sections.

5. In a stilt, the combination which comprises a standard having ratchet teeth in one side, a foot block slidably mounted on the standard, a lifting pawl pivotally mounted at a point adjacent the outer end thereof in the foot block and positioned to engage the ratchet teeth of the standard, means resiliently urging the lifting pawl into engagement with the ratchet teeth, a holding pawl pivotally mounted at a point spaced from the inner end thereof in the foot block with the pawl positioned to engage the ratchet teeth of the standard, resilient means urging the said holding pawl into engagement with the ratchet teeth, a link pivotally connecting the outer ends of the pawls, the point at which the said link is connected to the sleeve of the lifting pawl being relatively close to the pivot point of the sleeve and the point at which the link is connected to the holding pawl being a considerable distance from the pivot thereof whereby a slight movement of the outer end of the holding pawl provides a longer movement of the inner end of the lifting pawl so that the said lifting pawl moves upwardly to the next ratchet tooth of the standard, means resiliently urging the inner end of the lifting pawl downwardly, means resiliently urging the inner end of the holding pawl downwardly, and a stop in the foot block limiting upward movement of the said holding pawl.

CARL BRUNO.

REFERENCES CITED

The following references are of record in the file of this patent:

UNITED STATES PATENTS

| Number | Name | Date |
|---|---|---|
| 1,190,421 | Kalcy | July 11, 1916 |
| 1,708,030 | Petersen | Apr. 9, 1929 |
| 2,057,013 | Curtis | Oct. 13, 1936 |